US009161297B2

(12) United States Patent
Lee et al.

(10) Patent No.: US 9,161,297 B2
(45) Date of Patent: Oct. 13, 2015

(54) APPARATUS AND METHOD FOR SELECTING COMMUNICATION NETWORK

(75) Inventors: Jeong-Woo Lee, Daejeon (KR);
 Shin-Kyung Lee, Daejeon (KR);
 Doo-Seop Yun, Daejeon (KR);
 Oh-Cheon Kwon, Suwon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 291 days.

(21) Appl. No.: 13/560,611

(22) Filed: Jul. 27, 2012

(65) Prior Publication Data
 US 2013/0157711 A1 Jun. 20, 2013

(30) Foreign Application Priority Data
 Dec. 15, 2011 (KR) .................... 10-2011-0135871

(51) Int. Cl.
 *H04B 7/00* (2006.01)
 *H04W 48/18* (2009.01)
 *H04W 8/18* (2009.01)

(52) U.S. Cl.
 CPC ............. *H04W 48/18* (2013.01); *H04W 8/18* (2013.01)

(58) Field of Classification Search
 CPC ......... H04W 4/02; H04W 4/04; H04W 48/16; H04L 67/18; H04L 67/24; G06F 17/3087; G06F 17/3089; G06F 17/30893; G06F 3/011; G06F 17/30867; G06F 3/005; G06F 3/023; G06F 3/04817; G06F 3/04842; G06F 3/04847; G06F 3/04886; G06F 13/01
 USPC ........... 455/432.1, 435.2, 435.3, 456.3, 466.3
 See application file for complete search history.

(56) References Cited

U.S. PATENT DOCUMENTS

| | | | | |
|---|---|---|---|---|
| 7,363,379 | B2 * | 4/2008 | Tejaswini et al. ............. | 709/227 |
| 7,689,218 | B2 * | 3/2010 | Jiang et al. ................. | 455/435.2 |
| 8,150,421 | B2 * | 4/2012 | Ward et al. ................. | 455/456.5 |
| 8,374,644 | B2 * | 2/2013 | Nagasawa et al. ......... | 455/552.1 |
| 8,670,781 | B2 * | 3/2014 | Kim et al. ................... | 455/456.1 |
| 2009/0005061 | A1 * | 1/2009 | Ward et al. ................. | 455/456.1 |
| 2010/0222081 | A1 * | 9/2010 | Ward et al. ................. | 455/456.3 |
| 2011/0077028 | A1 * | 3/2011 | Wilkes et al. .............. | 455/456.3 |
| 2014/0073357 | A1 * | 3/2014 | Johnson ..................... | 455/456.3 |

FOREIGN PATENT DOCUMENTS

JP 2008-260332 A 10/2008

OTHER PUBLICATIONS

Lennart Isaksson et al., "Seamless Connectivity in WLAN and Cellular Networks with Multi Criteria Decision Making", IEEE, May 21-24, 2007, pp. 56-63.

Sourav Dhar et al., "Design and Simulation of Vertical Handover Algorithm for Vehicular Communication", International Journal of Engineering Science and Technology, 2010, pp. 5509-5525, vol. 2, No. 10.

* cited by examiner

*Primary Examiner* — Edward Urban
*Assistant Examiner* — Max Mathew
(74) *Attorney, Agent, or Firm* — Rabin & Berdo, P.C.

(57) ABSTRACT

Disclosed herein is an apparatus and method for selecting a communication network. The apparatus for selecting a communication network includes an information management unit for generating context-aware profile information based on communication situations of an area in which a vehicle is located and information which is set by a driver, and a communication network selection unit for selecting an optimal communication network in the area in which the vehicle is located, based on the context-aware profile information.

14 Claims, 6 Drawing Sheets

APPARATUS AND METHOD FOR SELECTING COMMUNICATION NETWORK

CROSS REFERENCE TO RELATED APPLICATION

This application claims the benefit of Korean Patent Application No. 10-2011-0135871, filed on Dec. 15, 2011, which is hereby incorporated by reference in its entirety into this application.

BACKGROUND OF THE INVENTION

1. Technical Field

The present invention relates generally to an apparatus and method for selecting a communication network and, more particularly, to an apparatus and method for selecting a communication network, which can select and provide the most suitable communication network in consideration of communication situations of an area in which a vehicle is located and information which is set by a user, in a communication environment in which various communication networks can be used.

2. Description of the Related Art

Recently, with the development of wireless communication networks, various types of service such as traffic information and telematics are provided in a vehicle that is driving over a wireless communication network.

However, cases where services cannot be smoothly provided depending on various types of environmental conditions or geographical conditions due to the characteristics of wireless communication networks frequently occur. Further, there is inconvenience in that at the moment at which a communication environment changes, a user must personally select an available communication network and reconnect the communication network.

In order to solve the problem, Japanese Unexamined Patent Application Publication No. 2008-260332 discloses technology which detects a wireless communication environment, selects a communicate route based on the wireless communication environment, and performs wireless communication without being influenced by a variation in the communication environment.

However, it is impossible to select another communication network having a better communication environment from among various communication networks and to provide a wireless communication environment in light of a user's opinion.

Therefore, technology for recognizing the environment of a place where a vehicle is located, selecting a communication network most suitable for the recognized environment, and providing the selected communication network is required.

SUMMARY OF THE INVENTION

Accordingly, the present invention has been made keeping in mind the above problems occurring in the prior art, and an object of the present invention is to provide an apparatus and method for selecting a communication network, which can select and provide the most suitable communication network in consideration of communication situations of an area in which a vehicle is located and information which is set by a user, in a communication environment in which various communication networks can be used.

In accordance with an aspect of the present invention, there is provided an apparatus for selecting a communication network, including an information management unit for generating context-aware profile information based on communication situations of an area in which a vehicle is located and information which is set by a driver; and a communication network selection unit for selecting an optimal communication network in the area in which the vehicle is located, based on the context-aware profile information.

Preferably, the communication network selection unit may include a connection setup verification unit for verifying a connection method selected by the driver of the vehicle based on the context-aware profile information; and a communication network determination unit for selecting the optimal communication network either using a recommended connection or based on priorities set by the driver depending on a result of the verification by the connection setup verification unit.

Preferably, the information management unit may be configured to calculate weights for respective recommended connection parameters selected based on the context-aware profile information by using relative comparison of an Analytic Hierarchy Process (AHP) technique, generate ranking scores of communication networks for each of the recommended connection parameters, and store the ranking scores in a parameter-based ranking score table.

Preferably, the communication network determination unit may be configured to, if the recommended connection has been set up, select the optimal communication network using both the context-aware profile information and the parameter-based ranking score table.

Preferably, the communication network determination unit may be configured to determine ranking scores of each communication network for the recommended connection parameters using the parameter-based ranking score table, add resulting values obtained by multiplying corresponding weights by the ranking scores, calculate a final network score for each communication network, and select a communication network having a highest score, from among final network scores for respective communication networks, as the optimal communication network.

Preferably, the communication network determination unit may be configured to, if the priority connection has been set up, check available communication networks based on the context-aware profile information, and select a communication network having a highest priority, from among the available communication networks, as the optimal communication network.

Preferably, the communication network determination unit may be configured to, if a connection to the optimal communication network has failed, increase a number of connection failures and select a next available communication network, to exclusion of the communication network for which the connection was attempted, as the optimal communication network.

Preferably, the context-aware profile information may include connection setup-related information, network status information, location information, and history information.

In accordance with an aspect of the present invention, there is provided a method of selecting a communication network, including generating context-aware profile information based on communication situations of an area in which a vehicle is located and information which is set by a driver; verifying a communication network connection method set by the driver using the context-aware profile information; and selecting an optimal communication network in the area in which the vehicle is located, based on the communication network connection method set by the driver.

Preferably, the selecting the optimal communication network may include determining whether automatic connection mode or manual connection mode has been set using the context-aware profile information; and if it is determined that the automatic connection mode has been set, determining whether a recommended connection or a priority connection has been set up.

Preferably, the method may further include calculating weights for respective recommended connection parameters selected based on the context-aware profile information, using relative comparison of an Analytic Hierarchy Process (AHP) technique; and generate ranking scores of communication networks for each of the recommended connection parameters, and store the ranking scores in a parameter-based ranking score table.

Preferably, the selecting the optimal communication network may include selecting the optimal communication network using both the context-aware profile information and the parameter-based ranking score table.

Preferably, the selecting the optimal communication network may include determining ranking scores of each communication network for the recommended connection parameters using the parameter-based ranking score table; adding resulting values obtained by multiplying corresponding weights by the ranking scores, thus calculating a final network score for each communication network; and selecting a communication network having a highest score, from among final network scores for respective communication networks, as the optimal communication network.

Preferably, the selecting the optimal communication network may include if the priority connection has been set up, checking supportable communication networks based on the context-aware profile information; detecting available communication networks having available signal strengths from the supportable communication networks; and selecting a communication network having a highest priority, from among the available communication networks, as the optimal communication network.

Preferably, the selecting the optimal communication network may include if a connection to the optimal communication network has failed, increasing a number of connection failures; determining whether the number of connection failures exceeds a preset value; and if it is determined that the number of connection failures does not exceed the preset value, selecting a next available communication network, to exclusion of the communication network for which the connection has failed, as the optimal communication network.

Preferably, the context-aware profile information may include connection setup-related information, network status information, location information, and history information.

In the embodiments of the present invention, an optimal communication network is selected in consideration of communication situations of an area in which a vehicle is located and information set by the driver, and a service is provided over the optimal communication network, thus enabling the service to be smoothly provided even in an area or an environment in which it is difficult to connect to a communication network.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
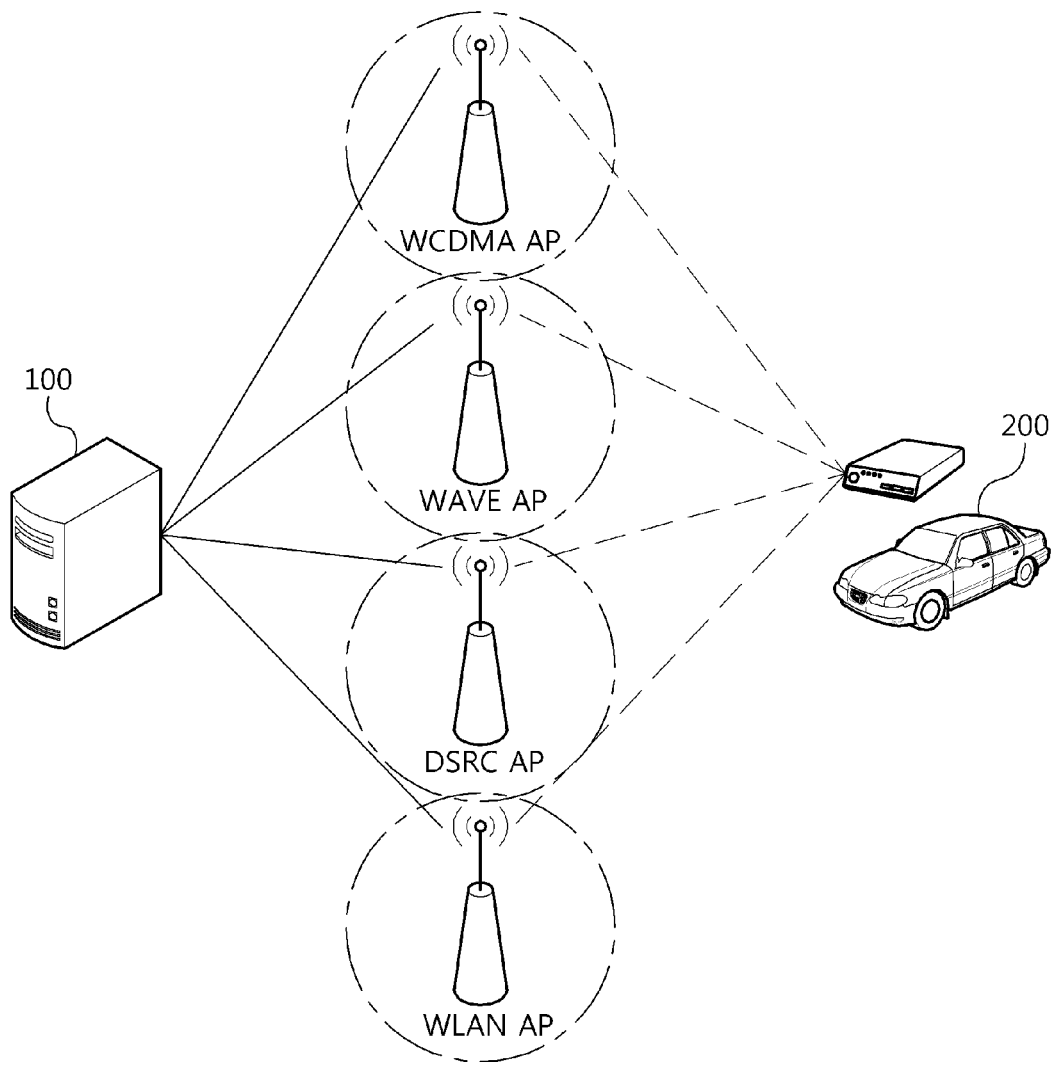
FIG. 1 is a diagram showing the concept of the selection of a communication network performed in consideration of communication situations of an area in which a vehicle is located, and information set by a user according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Figure 2:
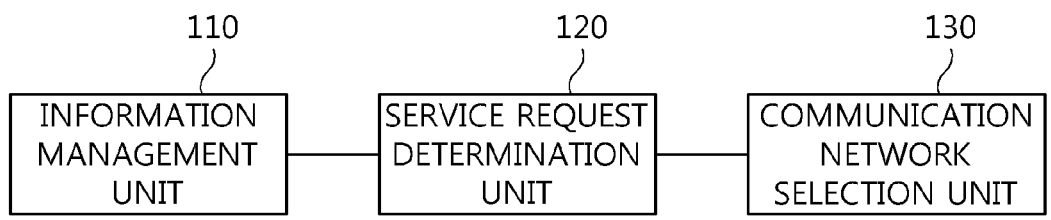
FIG. 2 is a diagram schematically showing an apparatus for selecting a communication network according to an embodiment of the present invention.
Figure 3:
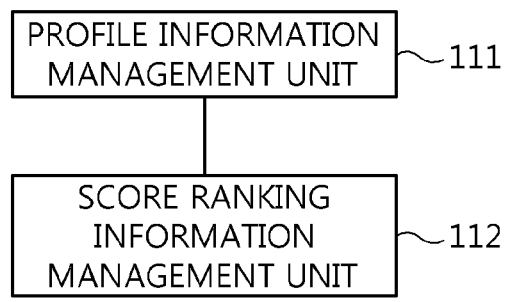
FIG. 3 is a diagram schematically showing the information management unit of FIG. 2.
Figure 4:
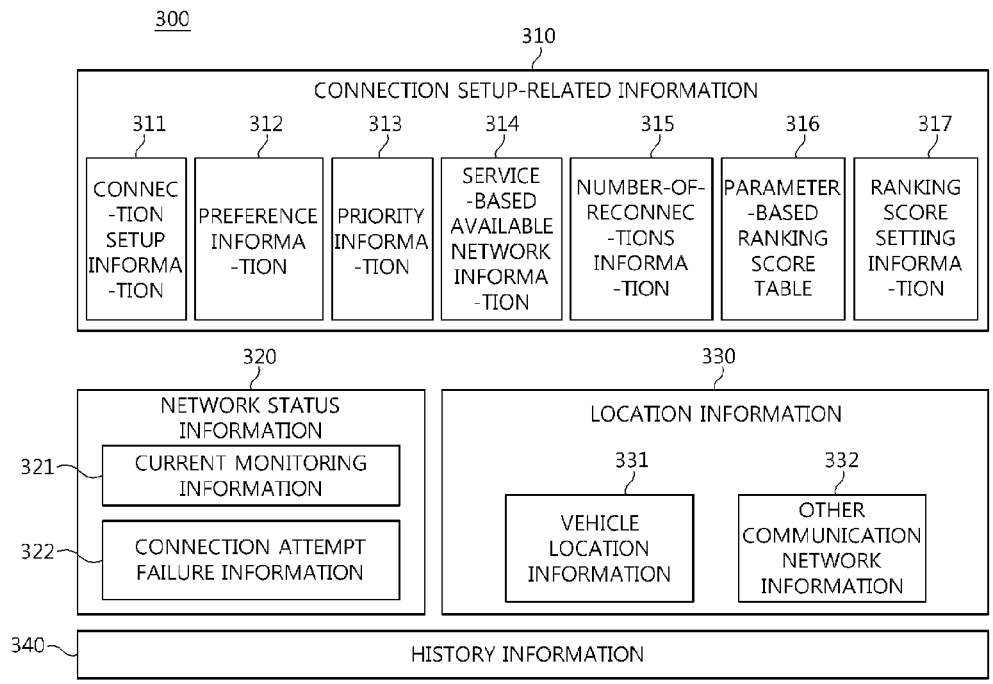
FIG. 4 is a diagram showing an example of context-aware profile information according to an embodiment of the present invention.
Figure 5:
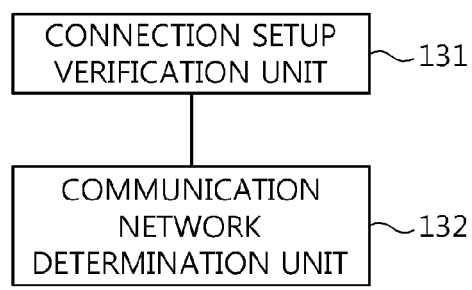
FIG. 5 is a diagram schematically showing the communication network selection unit of FIG. 2.

FIG. 1 is a diagram showing the concept of the selection of a communication network performed in consideration of communication situations of an area in which a vehicle is located, and information set by a user according to an embodiment of the present invention. FIG. 2 is a diagram schematically showing an apparatus for selecting a communication network according to an embodiment of the present invention. FIG. 3 is a diagram schematically showing the information management unit of FIG. 2. FIG. 4 is a diagram showing an example of context-aware profile information according to an embodiment of the present invention. FIG. 5 is a diagram schematically showing the communication network selection unit of FIG. 2.

As shown in FIG. 1, an apparatus 100 for selecting a communication network according to an embodiment of the present invention selects and provides an optimal and most suitable communication network in consideration of communication situations of an area in which a vehicle 200 is located (hereinafter referred to as "area communication situations") and information set by the driver of the vehicle 200 (hereinafter referred to as "driver setting information"), in a communication environment 10 in which various communication networks can be used.

The communication environment 10 according to the embodiment of the present invention includes wireless communication networks (hereinafter used together with "networks") such as a Wideband Code Division Multiple Access (WCDMA) network, a Wireless Access in Vehicular Environments (WAVE) network, a Dedicated Short-Range Communications (DSRC) network, and a Wireless Local Area Network (WLAN). Individual wireless communication networks are different from one another in possible coverage, information about whether each service can be supported according to the movement speed, the data transfer rate, link access time, etc., so that they have different supportable ranges or services.

In more detail, as shown in FIG. 2, the communication network selection apparatus 100 includes an information management unit 110, a service request determination unit 120, and a communication network selection unit 130.

As shown in FIG. 3, the information management unit 110 includes a profile information management unit 111 and a score ranking information management unit 112.

The profile information management unit 111 generates and manages context-aware profile information including area communication situations and driver setting information so as to provide an optimal communication network.

For example, referring to FIG. 4, context-aware profile information 300 includes connection setup-related information 310, network status information 320, location information 330, and history information 340.

The connection setup-related information 310 includes connection setup information 311, preference information 312, priority information 313, service-based available network information 314, and number-of-reconnections information 315.

The connection setup information 311 is information indicating a connection setup method selected by the driver. That is, when the connection setup information 311 is set to "automatic connection mode," a connection to an optimal communication network is automatically made without the intervention of the driver, and connection methods in automatic connection mode are classified into a recommended connection and a priority connection. When the connection setup information 311 is set to "manual connection mode," a connection to a desired communication network is made via the input of the driver.

The preference information 312 is information obtained by determining whether to connect to a communication network using the recommended connection or the priority connection of automatic connection methods in the situation in which the connection setup information 311 has been set to "automatic connection mode."

The priority information 313 is information obtained by setting the priorities of communication networks desired to be connected by the driver in the state in which the connection setup information 311 has been set to "automatic connection mode." Here, priorities are set for respective services such as traffic information and telematics, which are provided to the vehicle 200, and corresponding services are provided based on the set priorities.

The service-based available network information 314 is information indicating available communication networks for each of the services provided to the vehicle 200, and is used to determine which network is to be selected from among only supportable communication networks for each service when an optimal communication network is selected.

The number-of-reconnections information 315 is information indicating the number of reconnections to a communication network in the case where a connection to the corresponding communication network has failed. When a connection failure occurs even if the reconnection has been performed based on the number-of-reconnections information 315, an optimal network is reselected or, alternatively, a connection to a communication network that ranks next is made.

A parameter-based ranking score table 316 is a table in which ranking scores are previously calculated and stored depending on various types of situations for each parameter.

Ranking score setting information 317 stores the importance scores of communication networks for each recommended connection parameter set by the user and the importance scores of recommended connection parameters for each communication network.

The network status information 320 includes current monitoring information 321 and connection attempt failure information 322, and indicates information about the status of supportable communication networks.

The current monitoring information 321 is monitoring result information indicative of results obtained by performing monitoring based on the signal strength values of currently supportable communication networks, wherein the monitoring result information is periodically updated.

The connection attempt failure information 322 is information obtained by recording, for each communication network, the number of failures in attempts to connect to each selected communication network when the attempts to connect to the selected communication network have failed. The connection attempt failure information 322 is used to determine whether to reconnect to a current communication network or select another communication network.

The location information 330 includes vehicle location information 331 and other communication network information 332.

The vehicle location information 331 includes information related to an area in which the vehicle is currently located.

The other communication network information 332 includes the information of base stations related to other communication networks that are not installed all over the country, for example, WAVE and DSRC networks. The other communication network information 332 is used to determine whether services for other communication networks are available at the current location of the vehicle.

The history information 340 stores information about time at which an attempt to connect to an optimal communication network is made, communication network type information, connection setup information, connection success information, location information, service type information, etc. when the optimal communication network is selected and connected.

Referring back to FIG. 3, the score ranking information management unit 112 generates the information of the parameter-based ranking score table 316 using the relative comparison of an Analytic Hierarchy Process (AHP) technique depending on the importance of communication networks and the importance of recommended connection parameters. It is assumed that the recommended connection parameters according to the embodiment of the present invention include, but are not limited to, the ranking of preference levels for respective supportable communication networks, signal strengths, cost ranking, and network transfer rates, and other parameters may be added depending on the user's settings.

In detail, the score ranking information management unit 112 generates the ranking scores of communication networks for each recommended connection parameter on the basis of the importance scores of the communication networks for each recommended connection parameter, and stores the ranking scores in the parameter-based ranking score table 316. Further, the score ranking information management unit 112 calculates weights for the respective recommended connection parameters on the basis of the importance scores of recommended connection parameters for each communication network, and stores the calculated weights in the recommended connection parameter-based ranking score table 316.

In the case of user preference of recommended connection parameters according to the embodiment of the present invention, ranking scores are generated depending on regular differences between importance scores. The importance of cost information is determined based on the transfer rate and cost information of a current network. Individual importance scores can be changed depending on users' subjective viewpoints and can be adjusted using users' input.

Here, in the case of signal strengths, when a difference between signal strengths is large during the procedure of previously calculating ranking scores for respective communication networks, the signal strengths are also calculated with a large difference in importance in the relative comparison of AHP. That is, when a predetermined reference value is assigned to each difference between signal strengths, and each difference between signal strengths is equal to or greater than or equal to or less than the reference value, a difference in the importance of relative comparison suitable for such a difference is preset, and then relative comparison scores are calculated. In the case where the same signal strength is present when the signal strengths of respective communication networks are normalized, ranking scores are calculated for all of the cases (the cases where the signal strengths of two networks are identical, where the signal strengths of three networks are identical, where the signal strengths of two networks forming each pair are identical, etc.), and the ranking scores are applied when these cases occur. In this way, when several cases occur depending on differences between signal strengths, ranking scores for the respective cases are previously calculated and stored. When corresponding cases occur, ranking scores corresponding to the respective cases are searched for and applied to the cases, so that the ranking scores are finally determined.

Referring back to FIG. 2, the service request determination unit 120 checks a service selected by the driver from among services that can be currently provided to the vehicle 200. If it is determined that the driver selected the service, the service request determination unit 120 generates a service start signal and transfers it to the communication network selection unit 130.

The communication network selection unit 130 receives the service start signal from the service request determination unit 120. Further, the communication network selection unit 130 selects an optimal communication network based on the context-aware profile information 300 preset by the driver and the information of the parameter-based ranking score table 316.

As shown in FIG. 5, the communication network selection unit 130 includes a connection setup verification unit 131 and a communication network determination unit 132.

The connection setup verification unit 131 verifies a connection setup method selected by the driver based on the preference information 312 of the context-aware profile information 300.

In detail, the connection setup verification unit 131 verifies a connection method desired by the driver by checking preference information 312 when the connection setup information 311 of the preference information 312 is set to "automatic." The connection setup verification unit 131 generates a recommended connection request signal and transfers it to the communication network determination unit 132 when the preference information 312 is set to a "recommended connection." The connection setup verification unit 131 generates a priority request signal and transfers it to the communication network determination unit 132 when the preference information 312 is not set to the recommended connection.

The communication network determination unit 132 receives the recommended connection request signal or the priority request signal from the connection setup verification unit 131.

When the priority request signal is received, the communication network determination unit 132 checks supportable communication networks for each current service based on the service-based available network information 314 of the context-aware profile information 300. Further, the communication network determination unit 132 detects communication networks having available signal strengths from the supportable communication networks for each current service. If the number of available communication networks is at least one, the communication network determination unit 132 attempts to connect to a communication network depending on priorities set by the driver based on the priority information 313 of the context-aware profile information 300.

Meanwhile, when the recommended connection request signal is received, the communication network determination unit 132 determines an optimal communication network using a selection algorithm so that a communication network selected using a recommended connection can be connected. A detailed method of determining an optimal communication network using the selection algorithm according to an embodiment of the present invention will be described later.

If a connection to the communication network determined using a recommended connection or a priority connection has failed, the communication network determination unit 132 records the number of connection failures in the connection attempt failure information 322 of the context-aware profile information 300, and attempts a reconnection. If the number of connection failures exceeds a preset value, the communication network determination unit 132 determines again whether there are available communication networks with the exception of the communication network for which the connection attempts were made. That is, the communication network determination unit 132 attempts a recommended connection when the number of available networks is at least one and a recommended connection is selected, and attempts a priority connection when the number of available networks is at least one and a priority connection is selected, thus reselecting an optimal communication network.

Figure 6:
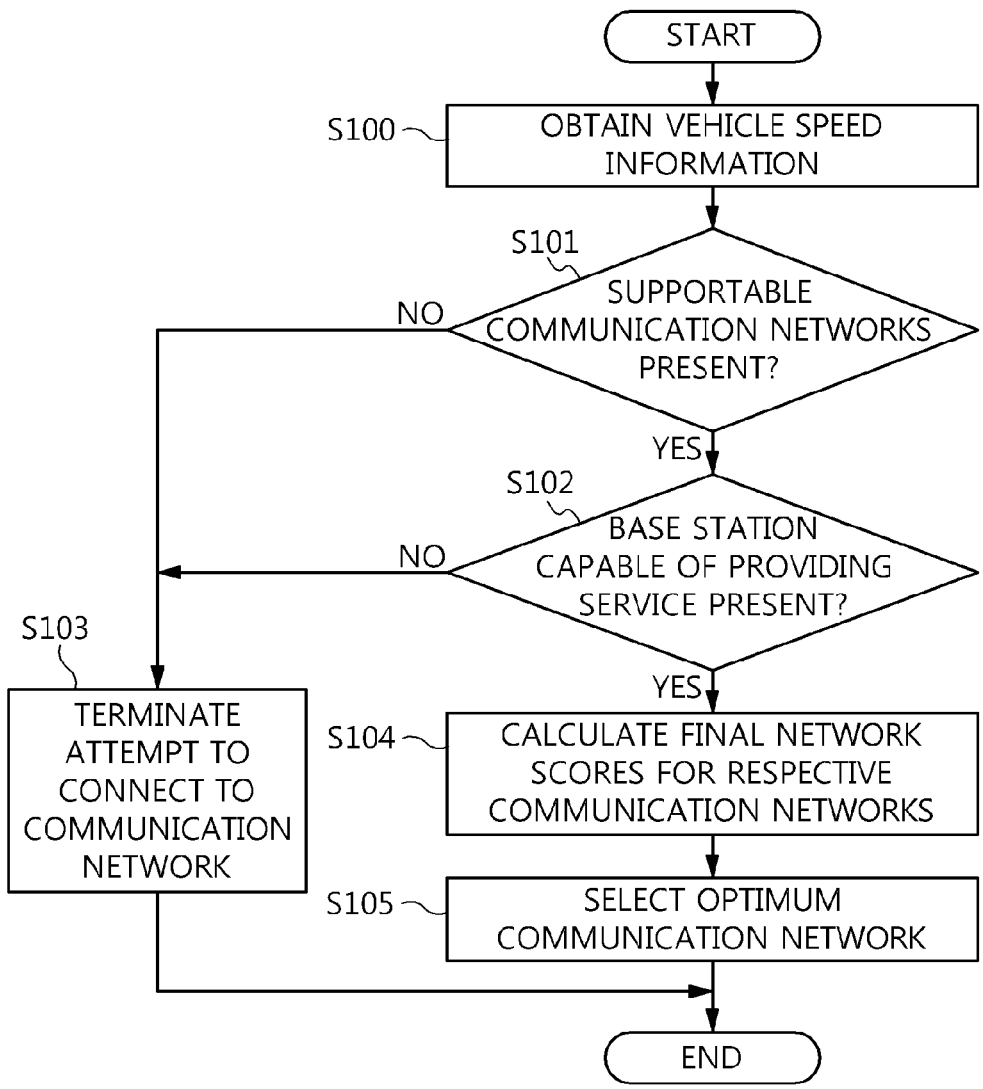
FIG. 6 is a flowchart showing a recommended connection method according to an embodiment of the present invention.

FIG. 6 is a flowchart showing a recommended connection method according to an embodiment of the present invention.

As shown in FIG. 6, the communication network selection unit 130 of the communication network selection apparatus 100 according to an embodiment of the present invention selects an optimal communication network using a network selection algorithm on the basis of the context-aware profile information 300 and the information of the parameter-based ranking score table 316.

The communication network selection unit 130 obtains the speed information of the vehicle from a Global Positioning System (GPS) or the like at step S100, and determines whether communication networks that are supportable at a relevant speed based on the speed information of the vehicle are present at step S101.

If it is determined at step S101 that supportable communication networks are present, the communication network selection unit 130 determines whether a base station capable of providing a service is present around an area in which the vehicle is currently located, based on the location information 330 of the context-aware profile information 300 at step S102.

If it is determined at step S102 that a base station capable of providing a service is not present around the area in which the vehicle is currently located, the communication network selection unit 130 determines that a connectable network is not present, and then terminates the attempt to connect to a communication network at step S103.

In contrast, if it is determined at step S102 that a base station capable of providing a service is present around the area in which the vehicle is currently located, the communication network selection unit 130 applies individual recommended connection parameters to the selection algorithm, and calculates final network scores based on the information of the parameter-based ranking score table 316.

In detail, the ranking score table stores weights for respective recommended connection parameters via the relative comparison of an AHP technique. Further, the parameter-based ranking score table 316 stores the ranking scores of the communication networks for each of the recommended connection parameters, calculated based on the importance scores of the communication networks for each recommended connection parameter. First, the communication network selection unit 130 detects weights for relevant parameters from the ranking score table. The ranking of the recommended connection parameters in a current communication network is preset for each communication network or calculated based on measured values. The communication network selection unit 130 searches the parameter-based ranking score table 316 for the relevant parameters depending on the ranking of the parameters calculated in this way, and then determines the respective ranking scores of communication networks for each parameter.

For example, in the case of preference ranking, the priorities of communication networks are determined based on priority information set by the user. In the case of the priorities determined in this way, ranking scores previously calculated for respective priorities are searched for in the parameter-based ranking score table 316 and applied, so that the ranking scores of communication networks for each parameter are designated.

In the same way, the communication network selection unit 130 sets the ranking of cost, transfer rate, and signal strength for each communication network, searches the parameter-based ranking score table 316 for corresponding ranking scores, determines the ranking scores of the communication network for the cost, transfer rate, and signal strength, and calculates the scores of the communication network for respective parameters by multiplying weights corresponding to the respective parameters by the ranking scores.

However, in the case of a signal strength, since reference values are different from one another for respective communication networks, the minimum values and maximum values of individual networks are unified, and signal strength values are normalized based on unified criteria, so that the signal strengths of the respective communication networks are compared under the same conditions. Further, since signal strengths are continuously changed, they are calculated using data obtained at the moment at which the optimal communication network is selected. In other words, the communication network selection unit 130 compares signal strength values normalized in this way with one another, and also calculates the ranking of signal strengths depending on the levels of signal strengths. Further, the communication network selection unit 130 calculates ranking scores depending on the ranking of the signal strengths, and determines the ranking scores of the communication networks by searching for the corresponding ranking scores.

That is, after the ranking scores of the respective recommended connection parameters have been calculated, the communication network selection unit 130 multiplies weights of corresponding recommended connection parameters by the ranking scores of each communication network with respect to the recommended connection parameters, and adds the resulting values, thus calculating the final network score of each communication network at step S104. The communication network selection unit 130 selects a communication network having the highest final network score from among the communication networks as an optimal communication network at step S105.

Figure 7:
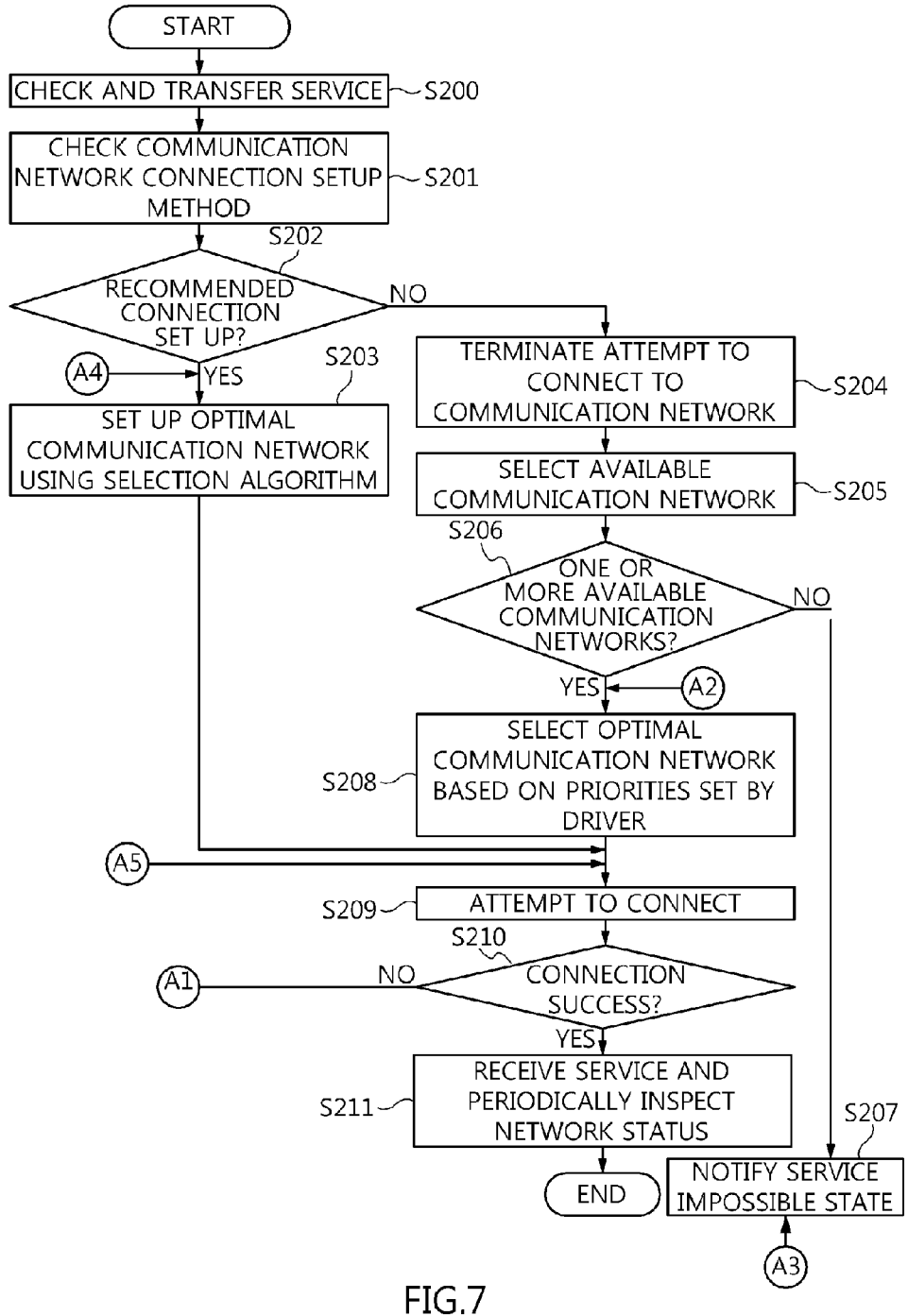
FIGS. 7 and 8 are flowcharts showing a method of selecting and providing an optimal communication network according to an embodiment of the present invention.
Figure 8:
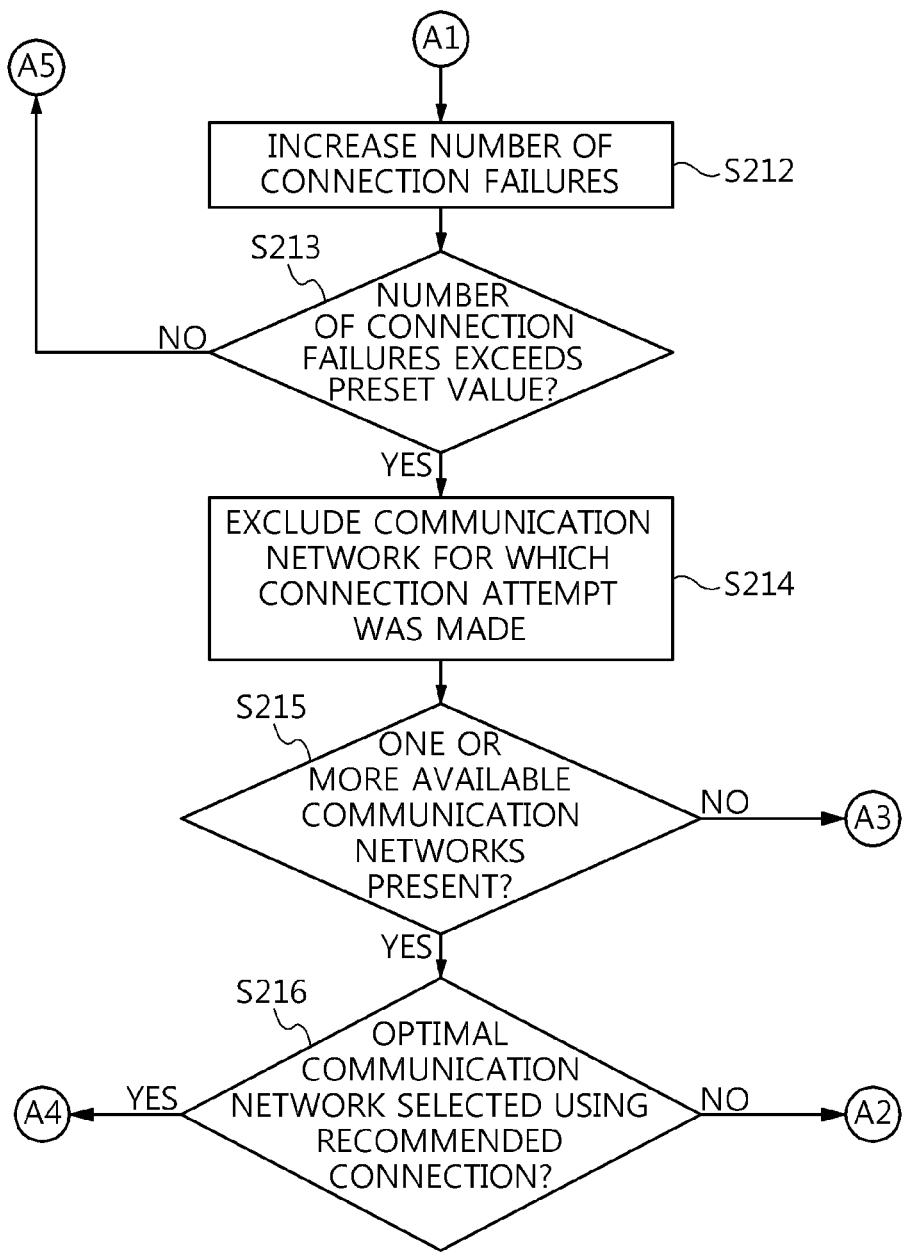

FIGS. 7 and 8 are flowcharts showing a method of selecting and providing an optimal communication network according to an embodiment of the present invention.

As shown in FIGS. 7 and 8, the service request determination unit 120 of the communication network selection apparatus 100 according to the embodiment of the present invention checks each service selected by a driver from among services that can be currently provided to the vehicle 200. The service request determination unit 120 generates a service start signal and transfers it to the communication network selection unit 130 at step S200.

The communication network selection unit 130 verifies a connection setup method which is required to connect to a communication network and which is selected by the driver, on the basis of the preference information 312 of context-aware profile information 300. That is, the communication network selection unit 130 verifies a connection method desired by the driver based on the preference information 312 when the connection setup information 311 of the preference information 312 is set to "automatic connection mode" at step S201.

The communication network selection unit 130 determines whether the driver has set up a recommended connection, based on the results of verifying the connection setup method at step S202.

If it is determined at step S202 that the driver has set up the recommended connection, the communication network selection unit 130 determines an optimal communication network using a selection algorithm so that the communication network selected using the recommended connection can be connected (see FIG. 5) at step S203.

In contrast, if it is determined at step S202 that the driver has not set up a recommended connection, the communication network selection unit 130 determines that the driver has set up a priority connection. The communication network selection unit 130 checks supportable communication networks for each current service based on the service-based available network information 314 of the context-aware profile information 300 at step S204. The communication network selection unit 130 detects communication networks having available signal strengths from the supportable communication networks for each current service at step S205. The communication network selection unit 130 determines whether the number of communication networks having available signal strengths is one or more at step S206.

If it is determined at step S206 that there is no communication network having an available signal strength, the communication network determination unit 132 notifies the driver of a state indicating that the current service is impossible at step S207. If it is determined at step S206 that the number of communication networks having available signal strengths is one or more, the communication network selection unit 130 sets up an optimal communication network depending on priorities set by the driver based on priority information 313 at step S208. Further, the communication network selection unit 130 attempts to connect to the optimal communication network at step S209, and determines whether the connection has succeeded at step S210.

If it is determined at step S210 that the connection to the optimal communication network has succeeded, the communication network selection unit 130 provides the corresponding service over the connected optimal communication network, receives services, and periodically inspects the status of the connected network at step S211.

If it is determined at step S210 that the connection to the optimal communication network has failed, the communication network selection unit 130 increases the number of connection failures in the connection attempt failure information 322 of the context-aware profile information 300 at step S212. Further, the communication network selection unit 130 determines whether the number of connection failures exceeds a preset value at step S213.

If it is determined at step S213 that the number of connection failures does not exceed the preset value, the communication network selection unit 130 performs the procedure after step S209 in the same manner. In contrast, if it is determined at step S213 that the number of connection failures exceeds the preset value, the communication network selection unit 130 excludes the communication network for which the connection attempt was made at step S214 and then determines again whether the number of available communication networks is one or more at step S215.

If it is determined at step S215 that one or more available communication networks are not present, the communication network determination unit 132 returns to the step S207 of notifying the driver of a state indicating that the current service is impossible. If it is determined at step S215 that one or more available communication networks are present, the communication network determination unit 132 determines whether an optimal communication network has been set up and connected using a recommended connection at step S216.

It is determined at step S216 that an optimal communication network has been set up and connected using the recommended connection, the communication network determination unit 132 returns to the step S203 of repeating the subsequent procedure in the same manner. If it is determined at step S216 that an optimal communication network has not been set up and connected using a recommended connection, the communication network determination unit 132 returns to the step S208 of setting up a communication network that ranks next and repeats the subsequent procedure in the same manner.

As described above, in the embodiments of the present invention, an optimal communication network is selected in consideration of communication situations of an area in which a vehicle is located and information set by the driver, and a service is provided over the optimal communication network, thus enabling the service to be smoothly provided even in an area or an environment in which it is difficult to connect to a communication network.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for selecting a communication network, comprising:
an information management unit for generating context-aware profile information based on communication situations of an area in which a vehicle is located and information which is set by a driver; and
a communication network selection unit for selecting an optimal communication network to which to make a connection, in the area in which the vehicle is located, based on the context-aware profile information;
wherein the information management unit is configured to calculate weights for respective recommended connection parameters associated with the connection, the recommended connection parameters selected based on the context-aware profile information;
wherein the communication network selection unit comprises:
a connection setup verification unit for verifying a connection method selected by the driver of the vehicle based on the context-aware profile information; and
a communication network determination unit for selecting the optimal communication network either using a recommended connection depending on a result of the verification by the connection setup verification unit or based on priorities set by the driver; and
wherein the information management unit is configured to calculate the weights by using relative comparison of an Analytic Hierarchy Process (AHP) technique, generate ranking scores of communication networks for each of the recommended connection parameters, and store the ranking scores in a parameter-based ranking score table; and wherein the generating the ranking scores depends at least partly on differences between importance scores associated with each of the respective recommended connection parameters, the importance scores including scores associated with an importance of cost information determined based on a transfer rate and cost information of a current network, and individual scores changeable based on user input.

2. The apparatus of claim 1, wherein the communication network determination unit is configured to, if the recommended connection has been set up, select the optimal communication network using both the context-aware profile information and the parameter-based ranking score table.

3. The apparatus of claim 2, wherein the communication network determination unit is configured to determine ranking scores of each communication network for the recommended connection parameters using the parameter-based ranking score table, add resulting values obtained by multiplying corresponding weights by the ranking scores, calculate a final network score for each communication network, and select a communication network having a highest score, from among final network scores for respective communication networks, as the optimal communication network.

4. The apparatus of claim 1, wherein the communication network determination unit is configured to, if a priority connection has been set up, check available communication networks based on the context-aware profile information, and select a communication network having a highest priority, from among the available communication networks, as the optimal communication network.

5. The apparatus of claim 1, wherein the communication network determination unit is configured to, if a connection to the optimal communication network has failed, increase a number of connection failures, exclude the communication network for which the connection was attempted, and select a next available communication network as the optimal communication network.

6. The apparatus of claim 1, wherein the context-aware profile information comprises connection setup-related information, network status information, location information, and history information.

7. A method of selecting a communication network, comprising:
   generating context-aware profile information, based on communication situations of an area in which a vehicle is located and information which is set by a driver;
   calculating weights for respective recommended connection parameters selected based on the context-aware profile information;
   verifying a communication network connection method set by the driver using the context-aware profile information; and
   selecting an optimal communication network in the area in which the vehicle is located, based on the communication network connection method set by the driver and the calculated weights;
   wherein the selecting the optimal communication network comprises:
   determining whether automatic connection mode or manual connection mode has been set using the context-aware profile information; and
   if it is determined that the automatic connection mode has been set, determining whether a recommended connection or a priority connection has been set up;
   and the method further comprising:
   calculating the weights using relative comparison of an Analytic Hierarchy Process (AHP) technique; and
   generating ranking scores of communication networks for each of the recommended connection parameters, and storing the ranking scores in a parameter-based ranking score table;
   wherein the generating the ranking scores depends at least partly on differences between importance scores associated with each of the respective recommended connection parameters, the importance scores including scores associated with an importance of cost information determined based on a transfer rate and cost information of a current network, and individual scores changeable based on user input.

8. The method of claim 7, wherein the selecting the optimal communication network selects the optimal communication network using both the context-aware profile information and the parameter-based ranking score table.

9. The method of claim 8, wherein the selecting the optimal communication network comprises:
   determining ranking scores of each communication network for the recommended connection parameters using the parameter-based ranking score table;
   adding resulting values obtained by multiplying corresponding weights by the ranking scores, thus calculating a final network score for each communication network; and
   selecting a communication network having a highest score, from among final network scores for respective communication networks, as the optimal communication network.

10. The method of claim 7, wherein the selecting the optimal communication network comprises:
    if the priority connection has been set up, checking supportable communication networks based on the context-aware profile information;
    detecting available communication networks having available signal strengths from the supportable communication networks; and
    selecting a communication network having a highest priority, from among the available communication networks, as the optimal communication network.

11. The method of claim 7, wherein the selecting the optimal communication network comprises:
    if a connection to the optimal communication network has failed, increasing a number of connection failures;
    determining whether the number of connection failures exceeds a preset value; and
    if it is determined that the number of connection failures does not exceed the preset value, selecting a next available communication network except the communication network for which the connection has failed, as the optimal communication network.

12. The method of claim 7, wherein the context-aware profile information comprises connection setup-related information, network status information, location information, and history information.

13. The apparatus of claim 1, wherein the context-aware profile information includes priority information relating to priorities of respective services provided by communication networks connectable-to by the apparatus, the respective services including at least one of traffic information or telematics, and service-based available network information indicating available communication networks for each of the respective services.

14. The method of claim 7, further comprising generating the ranking scores by calculating relative comparison scores associated with differences between signal strengths of respective communication networks compared to a reference value.

* * * * *